UNITED STATES PATENT OFFICE.

HENRY DANZER, OF PARIS, FRANCE, ASSIGNOR TO COMPAGNIE GENERALE DE PHONOGRAPHES CINEMATOGRAPHES ET APPAREILS DE PRECISION, OF PARIS, FRANCE.

PLASTIC MATERIAL USED IN THE MANUFACTURE OF KINEMATOGRAPHIC FILMS.

1,089,910.  Specification of Letters Patent.  Patented Mar. 10, 1914.

No Drawing. Application filed June 11, 1912. Serial No. 702,957.

*To all whom it may concern:*

Be it known that I, HENRY DANZER, citizen of the French Republic, residing at Paris, in the Department of the Seine, France, have invented certain new and useful Improvements in Plastic Material Used in the Manufacture of Kinematographic Films, of which the following is a specification.

My invention relates to plastic compositions and more particularly to the class of substances which are especially adapted for the manufacture of photographic films to be used with kinematographs and the like.

The principal object of my invention is to provide a plastic substance or composition which is insoluble in water and has a relatively high melting point so that none of the constituents forming the composition will be extracted, due to the treatment of the film with water during the photographic operations or driven off by the heat used in the drying of the films or in their subsequent use with kinematograph apparatus and the like.

The substance used for making the plastic and flexible material consists of cellulose derivatives or esters and more particularly cellulose acetate, dissolved in glycerin derivatives in which at least one of the hydroxyl groups of glycerin is replaced by an ether forming organic radical. By such glycerin derivatives all those compounds are to be understood in which one or several hydroxyl groups of the glycerin are replaced by one or several alcohol or phenol radicals, for instance:

1. The compounds obtained by combining glycerin with phenols or bodies having a phenol functon, said compounds being made to constitute complex ethers, in which a phenol radical *e. g.*, $OC_6H_5$, can be made to replace one, two or three of the hydroxyl groups of the glycerin. Compounds are thus obtained that have the following constitution, in which formulæ R is used to designate the aryl, (*e. g.* phenyl, $-C_6H_5$) radical of the phenol:

$$\begin{array}{ccc} CH_2-OR & CH_2-OR & CH_2-OR \\ CH-OH & CH-OH & CH-OR \\ CH_2-OH & CH_2-OR & CH_2-OR \end{array}$$

2. To these compounds the aryl, *e. g.* phenyl ethers may be added that are obtained from glycid, such as:

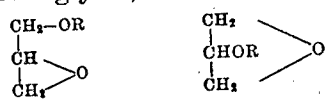

3. The phenol ethers of glycerin in which one or several of the remaining hydroxyl groups of the glycerin are replaced by an acid radical, for instance:

These solvents can be obtained by the action of the halogen derivatives of glycerin or glycid (chlorhydrins epichlorhydrins, or glycid (chlorhydrins epichlorhydrins, acetins and the like) on alcohols or phenols in the presence of an alkali. Among these compounds the following may more particularly be referred to: 1, the diphenyl ether of glycerin obtained for instance by the action of dichlorhydrin on sodium phenolate; 2, phenylglycid ether obtained for instance by the action of epichlorhydrin on sodium phenolate; 3, the chlorin derivatives of diphenyl ether of glycerin obtained for instance by the action of dichlorhydrin on chlorinated sodium phenolate; 4, the dicresyl ethers of glycerin obtained for instance by the action of dichlorhydrin on the cresylates of sodium. As regards the use of these compounds in the manufacture of plastic material, the same have the advantage of evaporating only at high temperature and of being slightly soluble only or even insoluble in water. They can therefore be used with advantage in the manufacture of photographic films as: 1, owing to said films being insoluble in water any deformation of the films by the extraction of these compounds by water during the photographic operations is avoided; 2, owing to their high boiling point these compounds are not eliminated or driven out in spite of the repeated drying that the films undergo during the photographic operations and the entire period of their subsequent use.

Having now particularly described and ascertained the nature of my said invention and in what manner the same is to be performed, I declare that what I claim is:

1. A plastic composition comprising a cellulose derivative and a glycerin derivative in which at least one of the hydroxyl groups of glycerin is replaced by an ether forming organic radical.

2. A plastic composition comprising an acidyl derivative of cellulose and a glycerin derivative in which at least one of the hydroxyl groups of glycerin is replaced by an ether forming organic radical.

3. A plastic composition comprising a cellulose acetate and a glycerin derivative in which at least one of the hydroxyl groups of glycerin is replaced by an ether forming organic radical.

4. A plastic composition comprising a cellulose ester and a glycerin derivative in which at least one of the hydroxyl groups of glycerin is replaced by a phenol radical.

5. A plastic composition comprising an acidyl derivative of cellulose and a glycerin derivative in which at least one of the hydroxyl groups of glycerin is replaced by a phenol radical.

6. A plastic composition comprising a cellulose acetate and a glycerin derivative in which at least one of the hydroxyl groups of glycerin is replaced by a phenol radical.

7. A plastic composition comprising a cellulose derivative and a glycerin derivative in which at least one of the hydroxyl groups of the glycerin is replaced by an organic ether-forming radical and in which at least another of the hydroxyl groups is replaced by an acid radical.

8. A plastic composition comprising a cellulose acetate and a glycerin derivative in which at least one of the hydroxyl groups of the glycerin is replaced by an organic ether-forming radical and in which at least another of the hydroxyl groups is replaced by an acid radical.

9. A plastic composition comprising a cellulose ester and a glycerin derivative in which at least one of the hydroxyl groups of glycerin is replaced by a phenol radical and in which another of the hydroxyl groups is replaced by an acid radical.

10. A plastic composition comprising a cellulose ester and a glycerin derivative in which at least one of the hydroxyl groups of glycerin is replaced by the radical $-OC_6H_5$.

11. A plastic composition comprising a cellulose acetate and a glycerin derivative in which at least one of the hydroxyl groups of glycerin is replaced by the radical $-OC_6H_5$.

In testimony whereof I affix my signature in presence of two witnesses.

HENRY DANZER.

Witnesses:
CHARLES DÉLIR,
LUCIEN CRESPIN.